United States Patent
Miyama et al.

(10) Patent No.: US 11,811,340 B2
(45) Date of Patent: Nov. 7, 2023

(54) CONTROL DEVICE FOR ROTATING ELECTRIC MACHINE AND DRIVE SYSTEM

(71) Applicants: Mitsubishi Electric Corporation, Tokyo (JP); Shibaura Institute of Technology, Tokyo (JP)

(72) Inventors: Yoshihiro Miyama, Tokyo (JP); Kan Akatsu, Tokyo (JP); Yuki Sakai, Tokyo (JP); Hiroki Hijikata, Tokyo (JP)

(73) Assignees: MITSUBISHI ELECTRIC CORPORATION, Tokyo (JP); SHIBAURA INSTITUTE OF TECHNOLOGY, Tokyo (JP)

( * ) Notice: Subject to any disclaimer, the term of this patent is extended or adjusted under 35 U.S.C. 154(b) by 208 days.

(21) Appl. No.: 17/603,363

(22) PCT Filed: Apr. 18, 2019

(86) PCT No.: PCT/JP2019/016630
§ 371 (c)(1),
(2) Date: Oct. 13, 2021

(87) PCT Pub. No.: WO2020/213124
PCT Pub. Date: Oct. 22, 2020

(65) Prior Publication Data
US 2022/0209697 A1    Jun. 30, 2022

(51) Int. Cl.
*H02P 21/00* (2016.01)
*H02P 21/22* (2016.01)
*H02P 27/12* (2006.01)

(52) U.S. Cl.
CPC .............. *H02P 21/22* (2016.02); *H02P 27/12* (2013.01); *H02P 2207/05* (2013.01)

(58) Field of Classification Search
CPC .................................. H02P 21/22; H02P 27/12
(Continued)

(56) References Cited

U.S. PATENT DOCUMENTS

| 5,525,849 A * | 6/1996 | Ito ........................ F16C 32/0438 |
| | | 310/90.5 |
| 2017/0222583 A1* | 8/2017 | Akimatsu ............... H02P 27/08 |
| 2019/0372496 A1* | 12/2019 | Watahiki .................. H02P 6/10 |

FOREIGN PATENT DOCUMENTS

| JP | 2007-189836 A | 7/2007 |
| JP | 2013-115901 A | 6/2013 |

OTHER PUBLICATIONS

International Search Report and Written Opinion dated Jul. 2, 2019, received for PCT Application PCT/JP2019/016630, Filed on Apr. 18, 2019, 9 pages including English Translation.

* cited by examiner

*Primary Examiner* — Erick D Glass
(74) *Attorney, Agent, or Firm* — XSENSUS LLP

(57) ABSTRACT

Provided is a control device for a rotating electric machine, the control device being configured to control an inverter configured to apply a voltage to each phase winding of a rotating electric machine, to thereby control, for the each phase winding, a current to be supplied to the each phase winding, the control device including a control unit configured to: calculate a voltage command value to be applied to the each phase winding so that a phase difference between harmonic components of the same order in a radial magnetic flux density and a circumferential magnetic flux density of an air gap portion between a stator core and a rotor core of the rotating electric machine becomes a phase difference target value determined in advance, and to control the inverter in accordance with the calculated voltage command value.

8 Claims, 8 Drawing Sheets

(58) Field of Classification Search
USPC .................................................. 318/400.02
See application file for complete search history.

CONTROL DEVICE FOR ROTATING ELECTRIC MACHINE AND DRIVE SYSTEM

CROSS-REFERENCE TO RELATED APPLICATION

The present application is based on PCT filing PCT/JP2019/016630, filed Apr. 18, 2019, the entire contents of which are incorporated herein by reference.

TECHNICAL FIELD

The present invention relates to a control device for a rotating electric machine, and to a drive system including the control device. The control device is configured to control an inverter configured to apply a voltage to each phase winding of the rotating electric machine, to thereby control, for the each phase winding, a current to be supplied to the each phase winding.

BACKGROUND ART

Hitherto, as a method of increasing output torque per effective value of a current to be supplied to a rotating electric machine, the following method has been proposed (see, for example, Patent Literature 1). That is, a harmonic wave included in a non-load induced voltage generated in a phase winding of the rotating electric machine is added to a command value so that a harmonic component of a magnet torque is used.

Further, as a method of controlling an instantaneous torque of the rotating electric machine, the following method has been proposed (see, for example, Patent Literature 2). That is, two magnetic flux sensors are embedded in an outermost periphery of a back yoke of the rotating electric machine, and a difference between detection signals of the two magnetic flux sensors is obtained as a magnetic-pole magnetic-flux detection value. The magnetic-pole magnetic-flux detection value and a magnetic-pole magnetic-flux command value are compared to each other to control a voltage to be applied to a winding.

CITATION LIST

Patent Literature

[PTL 1] JP 2013-115901 A
[PTL 2] JP 2007-189836 A

SUMMARY OF INVENTION

Technical Problem

Here, in the related art described in Patent Literature 1, the magnet torque can be increased, but a reluctance torque cannot be increased. Accordingly, an improvement of a current-torque characteristic in consideration of a harmonic component included in a magnetic flux density of an air gap portion (hereinafter referred to as "air gap magnetic flux density") cannot be achieved. The air gap portion corresponds to an air gap between a stator core and a rotor core. Further, in the related art described in Patent Literature 2, no discussion is given to the improvement of the current-torque characteristic in consideration of the harmonic component included in the air gap magnetic flux density.

The present invention has been made to solve the above-mentioned problems, and has an object to provide a control device for a rotating electric machine with which, in a rotating electric machine, an improvement of a current-torque characteristic in consideration of a harmonic component included in an air gap magnetic flux density is to be achieved, and to provide a drive system including the control device.

Solution to Problem

According to the present invention, there is provided a control device for a rotating electric machine, the control device being configured to control an inverter configured to apply a voltage to each phase winding of a rotating electric machine, to thereby control, for the each phase winding, a current to be supplied to the each phase winding, the control device including a control unit configured to calculate a voltage command value to be applied to the each phase winding so that a phase difference between harmonic components of the same order in a radial magnetic flux density and a circumferential magnetic flux density of an air gap portion between a stator core and a rotor core of the rotating electric machine becomes a phase difference target value determined in advance, and to control the inverter in accordance with the calculated voltage command value.

According to the present invention, there is provided a drive system, including: the above-mentioned control device for a rotating electric machine; the inverter; the rotating electric machine; and a circumferential magnetic flux density detection unit which is provided to the stator core of the rotating electric machine, and is configured to detect the circumferential magnetic flux density.

Advantageous Effects of Invention

According to the present invention, the control device for a rotating electric machine with which, in the rotating electric machine, the improvement of a current-torque characteristic in consideration of the harmonic component included in an air gap magnetic flux density is to be achieved, and the drive system including the control device can be obtained.

DESCRIPTION OF EMBODIMENTS

A control device for a rotating electric machine and a drive system including the control device according to exemplary embodiments of the present invention are described by referring to the accompanying drawings. In the illustration of the drawings, the same components or the corresponding parts are denoted by the same reference symbols, and the overlapping description thereof is herein omitted.

First Embodiment

Figure 1:
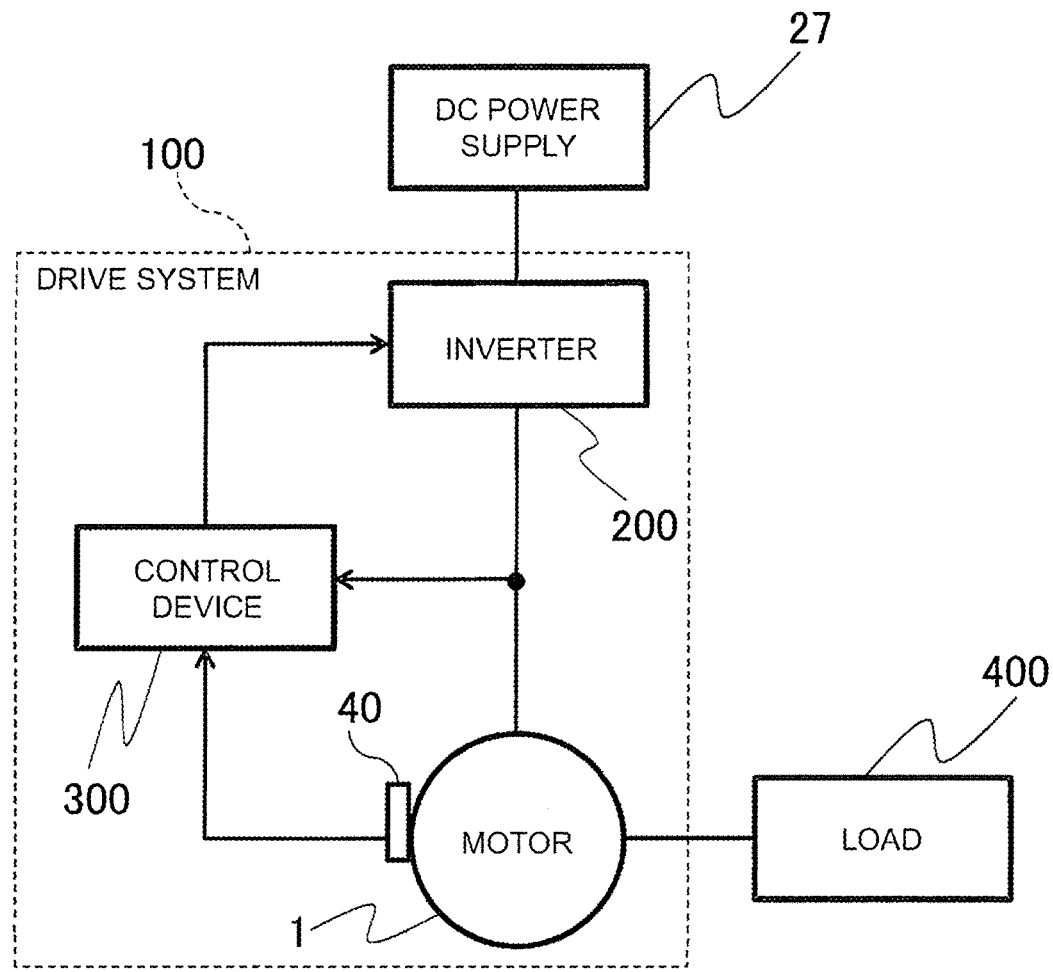
FIG. 1 is a block diagram for illustrating a configuration of a drive system according to a first embodiment of the present invention.

FIG. 1 is a block diagram for illustrating a configuration of a drive system 100 according to a first embodiment of the present invention. As illustrated in FIG. 1, the drive system 100 includes a motor 1, a circumferential magnetic flux density detection unit 40 provided to the motor 1, an inverter 200, and a control device 300. Further, a DC power supply 27 and a load 400 are connected to the drive system 100.

The motor 1 is an example of a rotating electric machine to which the present invention is applied, and is an eight-pole forty-eight-slot permanent magnet motor. The motor 1 is connected to the external load 400. The inverter 200 is configured to perform a mutual conversion between DC power and AC power. A DC-side terminal of the inverter 200 is connected to the external DC power supply 27, and an AC-side terminal of the inverter 200 is connected to the motor 1.

The control device 300 is configured to detect information related to a state of the motor 1, generate a control signal for controlling the inverter 200 based on the detected information, and to output the generated control signal to the inverter 200, to thereby control the state of the motor 1.

Figure 2:
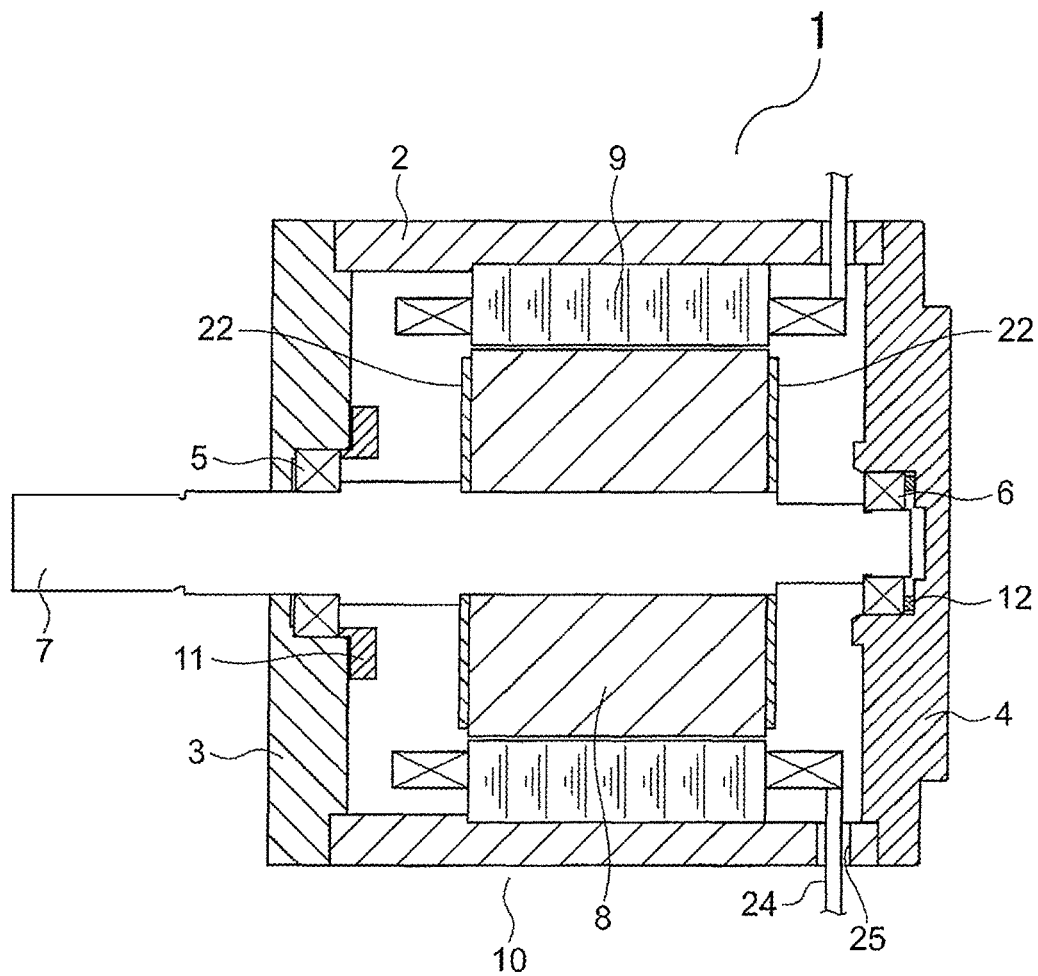
FIG. 2 is a sectional view for illustrating structure of a motor of FIG. 1, which is taken along a rotation axis.
Figure 3:
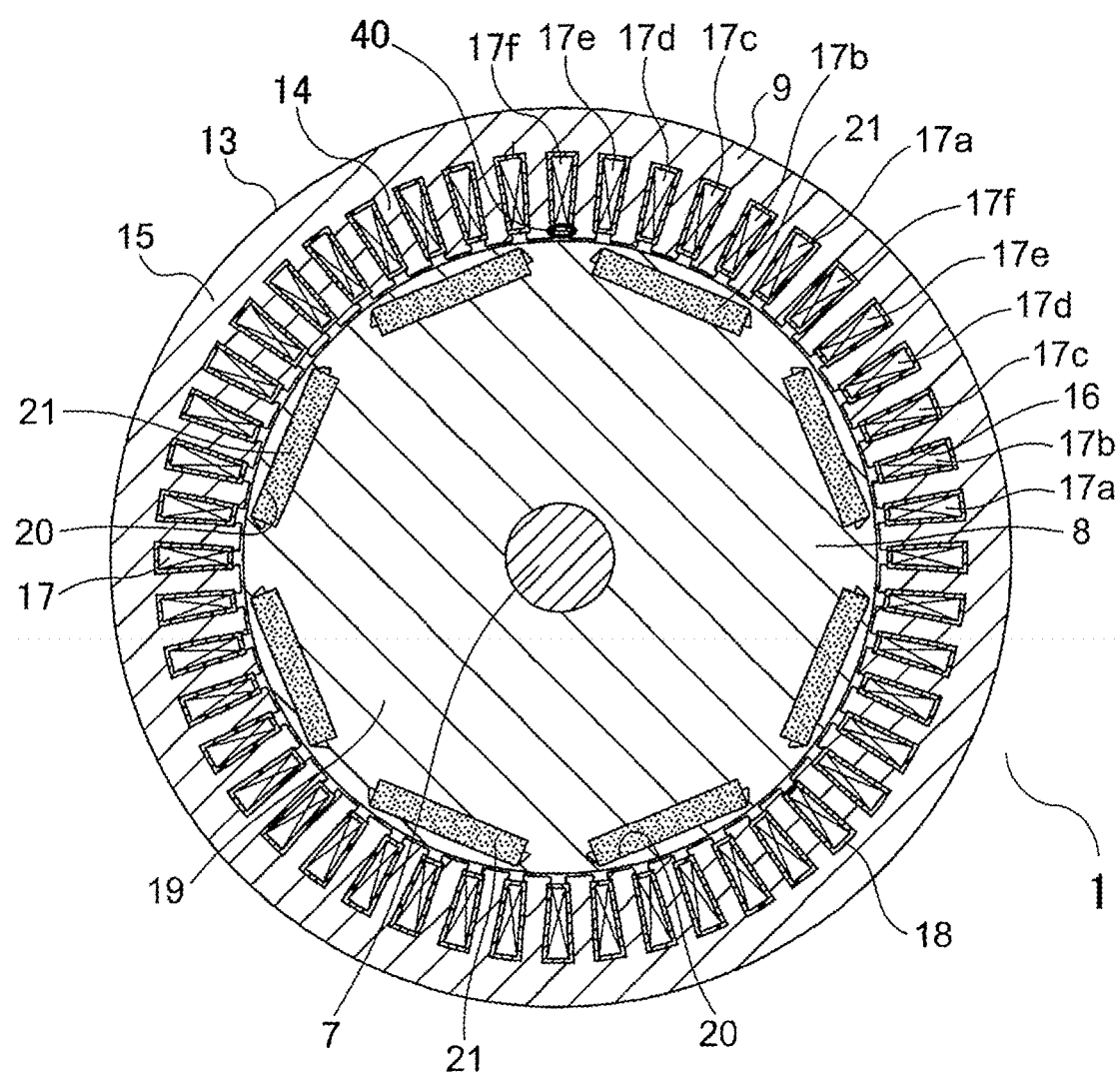
FIG. 3 is a sectional view for illustrating the structure of the motor of FIG. 1, which is taken vertically to the rotation axis.

Next, an example of structure of the motor 1 is described with reference to FIG. 2 and FIG. 3. FIG. 2 is a sectional view for illustrating the structure of the motor 1 of FIG. 1, which is taken along a rotation axis. FIG. 3 is a sectional view for illustrating the structure of the motor 1 of FIG. 1, which is taken vertically to the rotation axis. In FIG. 3, there is exemplified a case in which the number of teeth 14 and the number of stator slots 16 each are forty eight, and the number of permanent magnets 21 is eight.

As illustrated in FIG. 2, a load-side bracket 3 and a counter-load-side bracket 4 are provided so as to cover both sides of a cylindrical frame 2. A shaft 7 is arranged on a center axis of the frame 2, and is freely rotatably supported at two points by the load-side bracket 3 and the counter-load-side bracket 4 through intermediation of a load-side bearing 5 and a counter-load-side bearing 6.

A case 10 has the shaft 7 inserted therein, and is formed of the frame 2, the load-side bracket 3, and the counter-load-side bracket 4. A rotor 8 is accommodated in the case 10. An annular stator 9 is fixed to an inner wall surface of the frame 2 by press fitting, shrink fitting, or other methods, and is arranged with an air gap being formed between the stator 9 and the rotor 8.

The load-side bearing 5 is fixed to the load-side bracket 3 by a bearing presser 11. The counter-load-side bearing is fixed to the counter-load-side bracket 4 through intermediation of a wave washer 12 with a degree of freedom in an axial direction. The case 10 is formed by fixing the load-side bracket 3 and the counter-load-side bracket 4 to the frame 2.

As illustrated in FIG. 3, the stator 9 includes a stator core 15 and phase windings 17 corresponding to six phases. The phase windings 17 are each assembled and formed on the stator core 15 in a wave winding form. For the sake of convenience of description, when the phase windings 17 corresponding to the six phases are to be distinguished from each other, the phase windings 17 are described as a phase winding 17a, a phase winding 17b, a phase winding 17c, a phase winding 17d, a phase winding 17e, and a phase winding 17f.

The stator core 15 is formed by stacking a plurality of thin steel plates each having both surfaces subjected to insulating processing. The stator core 15 includes an annular yoke 13, forty-eight teeth 14, and forty-eight stator slots 16. The teeth 14 each extend radially inward from an inner peripheral surface of the yoke 13, and are arrayed at equal intervals in a circumferential direction. The stator slots 16 are each formed between the teeth 14 adjacent to each other in the circumferential direction.

The phase windings 17 corresponding to the six phases are mounted to the stator core 15 while shifting the stator slots 16 in which the phase windings 17 are wound by one slot. Each of the phase windings 17 corresponding to the six phases is formed by winding one conductive wire covered with an insulator 18 in every six stator slots 16 for three turns in a wave pattern in the circumferential direction. FIG. 3 should accurately show a cross section of a part of three portions of the phase windings arranged in each stator slot 16, but for the sake of convenience, the portions are collectively illustrated as one.

Both ends of the each phase winding 17 are connected to a load-side lead 23 and a counter-load-side lead 24, respectively. The load-side lead 23 and the counter-load-side lead 24 are each led out to the outside of the motor 1 through a lead-out port 25 formed in the frame 2.

The rotor 8 includes a columnar rotor core 19 and eight permanent magnets 21. The permanent magnets 21 are arrayed in an outer peripheral surface of the rotor core 19 at equal intervals in the circumferential direction.

In the rotor core 19, eight magnet slots 20 are formed. The magnet slots 20 each extend in the axial direction of the rotor core 19, and are arrayed at equal intervals in the circumferential direction. The eight permanent magnets 21 are arranged in the magnet slots 20 one by one so that an N pole and an S pole are alternately located along the circumferential direction.

End plates 22 are fixed to both ends of the rotor core 19 in the axial direction to close both sides of each magnet slot 20. It is preferred that the end plates 22 be made of a non-magnetic material.

Figure 4:
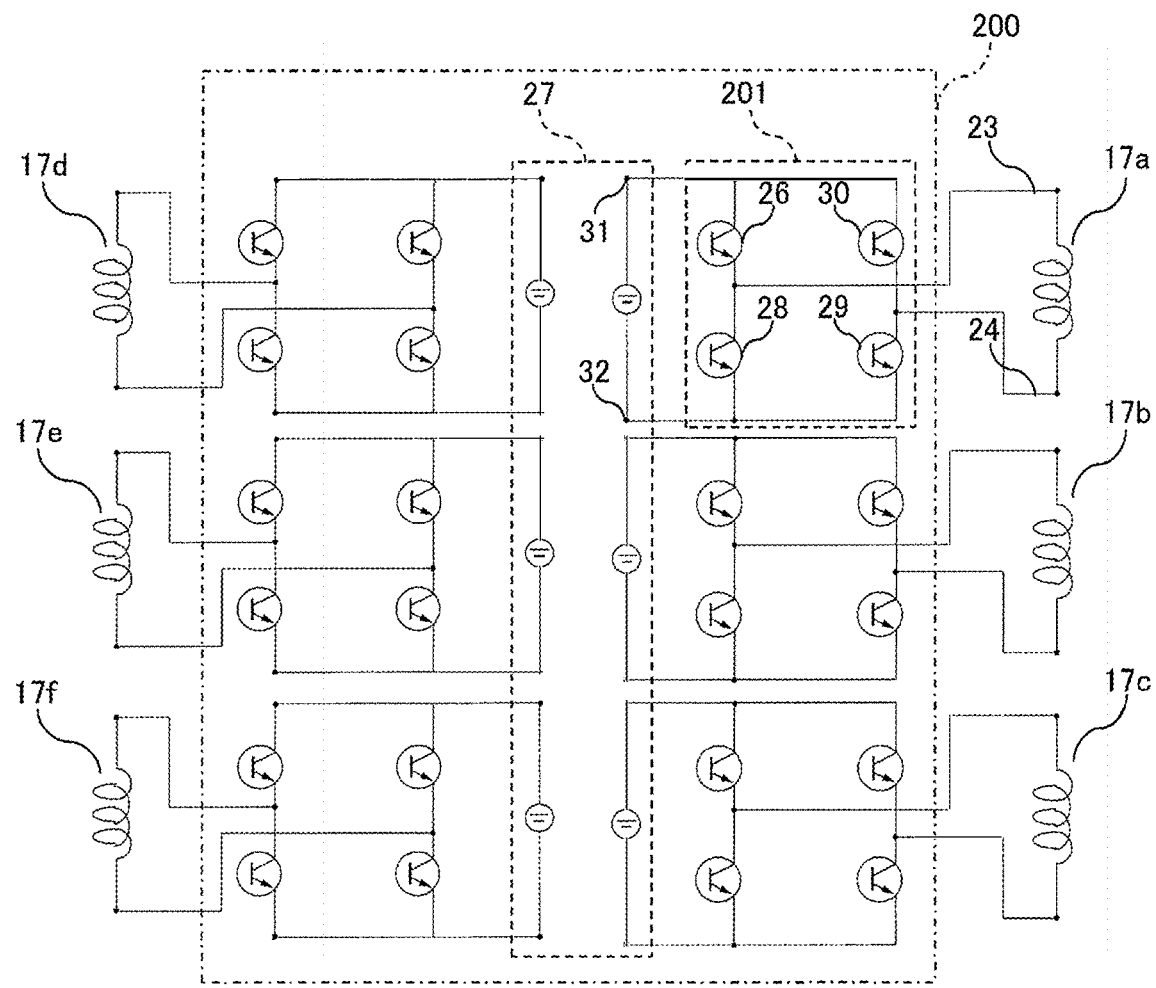
FIG. 4 is a circuit diagram for illustrating a configuration of an inverter of FIG. 1.

Next, a configuration of the inverter 200 is described with reference to FIG. 4. FIG. 4 is a circuit diagram for illustrating the configuration of the inverter 200 of FIG. 1.

In FIG. 4, the inverter 200 includes six inverter sub-units 201 individually corresponding to the phase windings 17a to 17f. The inverter sub-units 201 are each formed of a so-called H-bridge circuit including four switches, that is, a first positive-side switch 26, a first negative-side switch 28, a second negative-side switch 29, and a second positive-side switch 30. Each of the four switches can be switched between ON and OFF in accordance with control performed by the control device 300 illustrated in FIG. 1.

The load-side lead 23 of the inverter sub-unit 201 is electrically connected to a positive terminal 31 of the DC power supply 27 via the first positive-side switch 26, and is also electrically connected to a negative terminal 32 of the DC power supply 27 via the first negative-side switch 28.

The counter-load-side lead 24 of the inverter sub-unit 201 is electrically connected to the negative terminal 32 of the DC power supply 27 via the second negative-side switch 29, and is also electrically connected to the positive terminal 31 of the DC power supply 27 via the second positive-side switch 30.

The first positive-side switch 26, the second positive-side switch 30, the first negative-side switch 28, and the second negative-side switch 29 are each formed of a semiconductor switch using a silicon semiconductor. As specific examples of the semiconductor switch, an insulated-gate bipolar transistor, a field-effect transistor, for example, a metal-oxide-semiconductor field-effect transistor (MOSFET), and the like can be given. Those four switches may each be formed of a semiconductor switch using, for example, a wide bandgap semiconductor such as silicon carbide or gallium nitride.

A free-wheeling diode is inserted in parallel to each of the first positive-side switch 26, the second positive-side switch 30, the first negative-side switch 28, and the second negative-side switch 29.

The phase windings 17a to 17f are electrically connected to the H-bridge circuits individually corresponding thereto, respectively. Further, the six H-bridge circuits are electrically connected to DC power supplies individually corresponding thereto, respectively. The DC power supply 27 is formed of the six DC power supplies provided so as to individually correspond to the six H-bridge circuits. The DC power supply is formed of, for example, a battery. As specific examples of the battery, a lead battery, a lithium ion battery, and the like can be given.

When the first positive-side switch 26 and the second negative-side switch 29 are turned on and the first negative-side switch 28 and the second positive-side switch 30 are turned off in accordance with the control performed by the control device 300, an end portion of the load-side lead 23 becomes a positive-side potential, and an end portion of the counter-load-side lead 24 becomes a negative-side potential. As a result, a current flows through the phase winding 17 from the load-side lead 23 toward the counter-load-side lead 24.

Further, when the first positive-side switch 26 and the second negative-side switch 29 are turned off and the first negative-side switch 28 and the second positive-side switch 30 are turned on in accordance with the control performed by the control device 300, the end portion of the load-side lead 23 becomes a negative-side potential, and the end portion of the counter-load-side lead 24 becomes a positive-side potential. As a result, a current flows through the phase winding 17 from the counter-load-side lead 24 toward the load-side lead 23.

Further, when the first positive-side switch 26, the first negative-side switch 28, the second negative-side switch 29, and the second positive-side switch 30 are all turned off in accordance with the control performed by the control device 300, the phase winding 17 is disconnected from the DC power supply 27. As a result, no current flows through the phase winding 17.

As described above, the control device 300 is configured to switch, for each of the six H-bridge circuits, each of the first positive-side switch 26, the first negative-side switch 28, the second negative-side switch 29, and the second positive-side switch 30 between ON and OFF, and further to change a ratio between an ON time and an OFF time of each switch. In this manner, the control device 300 is capable of controlling, individually for each phase winding, an amplitude and a phase of a current to be supplied to each of the phase windings 17a to 17f.

Figure 5:
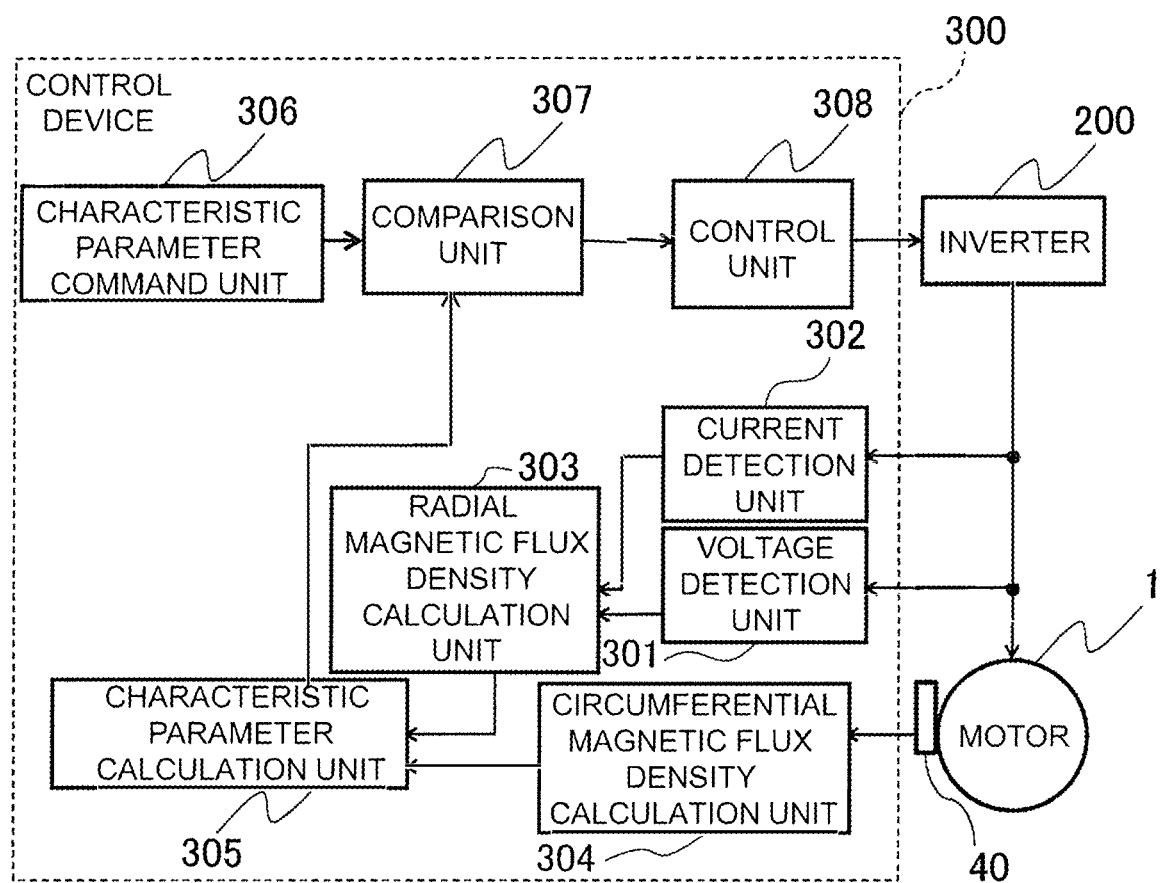
FIG. 5 is a block diagram for illustrating a configuration of a control device according to the first embodiment of the present invention.

Next, a configuration of the control device 300 is described with reference to FIG. 5. FIG. 5 is a block diagram for illustrating the configuration of the control device 300 according to the first embodiment of the present invention.

As illustrated in FIG. 5, the control device 300 includes a voltage detection unit 301, a current detection unit 302, a radial magnetic flux density calculation unit 303, a circumferential magnetic flux density calculation unit 304, a characteristic parameter calculation unit 305, a characteristic parameter command unit 306, a comparison unit 307, and a control unit 308.

The voltage detection unit 301 is configured to detect voltages va, vb, vc, vd, ve, and vf to be applied to both end portions of the phase windings 17a to 17f, respectively, and to output the detected six voltages va to vf to the radial magnetic flux density calculation unit 303.

The current detection unit 302 is configured to detect currents ia, ib, ic, id, ie, and if to be supplied to the phase windings 17a to 17f, respectively, and to output the detected six currents ia to if to the radial magnetic flux density calculation unit 303.

The radial magnetic flux density calculation unit 303 receives, as input, a detection result of the voltage detection unit 301, a detection result of the current detection unit 302, and a magnetic pole position of the motor 1 to be used for dq conversion and dq inverse conversion.

The magnetic pole position to be input to the radial magnetic flux density calculation unit 303 is calculated through use of, for example, output of a rotation position sensor (not shown) mounted to the motor 1. As the magnetic pole position to be input to the radial magnetic flux density calculation unit 303, a magnetic pole position estimation value calculated through superimposition of a harmonic magnetic flux or through use of an induced voltage waveform may be used.

The radial magnetic flux density calculation unit 303 is configured to calculate, based on the six voltages va to vf input from the voltage detection unit 301, the six currents ia to if input from the current detection unit 302, and the input magnetic pole position, harmonic components $\lambda xd3$, $\lambda xd5$, ... of respective orders in a radial d-axis magnetic flux density and harmonic components $\lambda xq3$, $\lambda xq5$, ... of respective orders in a radial q-axis magnetic flux density. Further, the radial magnetic flux density calculation unit 303 is configured to output the calculation result to the characteristic parameter calculation unit 305.

The number assigned to $\lambda xd$ represents the order of the harmonic component. For example, $\lambda xd3$ represents a third-order harmonic component in the radial d-axis magnetic flux density. Similarly, the number assigned to $\lambda xq$ represents the order of the harmonic component. For example, $\lambda xq3$ represents a third-order harmonic component in the radial q-axis magnetic flux density.

Now, description is given of the above-mentioned calculation processing to be performed by the radial magnetic flux density calculation unit 303. The radial magnetic flux density calculation unit 303 calculates, through use of the six voltages va to vf, the six currents ia to if, and a resistance R of each of the phase windings 17a to 17f known in advance, magnetic flux densities $\lambda a$, $\lambda b$, $\lambda c$, $\lambda d$, $\lambda e$, and $\lambda f$ interlinking with the phase windings 17a to 17f, respectively, from a relationship of $\lambda = \int (v - R \times i) dt$.

Subsequently, the radial magnetic flux density calculation unit 303 calculates, through use of the calculated six magnetic flux densities $\lambda a$ to $\lambda f$, magnetic flux densities $\lambda Txa$, $\lambda Txb$, $\lambda Txc$, $\lambda Txd$, $\lambda Txe$, and $\lambda Txf$ in the radial direction, which are to be generated at the respective six teeth 14 individually corresponding to the phase windings 17a to 17f.

Specifically, the radial magnetic flux density calculation unit 303 calculates, based on a difference between magnetic flux densities interlinking with two phase windings arranged in two adjacent stator slots 16, respectively, a magnetic flux density to be generated at a tooth corresponding to one of the two phase windings. For example, the radial magnetic flux density calculation unit 303 calculates, based on a difference between the magnetic flux density $\lambda a$ interlinking with the phase winding 17a arranged in one stator slot 16 and the magnetic flux density $\lambda b$ interlinking with the phase winding 17b arranged in another stator slot 16 adjacent to the stator slot 16 in which the phase winding 17a is arranged, the magnetic flux density $\lambda Txa$ to be generated at the tooth 14 corresponding to the phase winding 17a. The calculation of the magnetic flux densities $\lambda Txb$ to $\lambda Txf$ is performed similarly to the calculation of the magnetic flux density $\lambda Txa$.

Subsequently, the radial magnetic flux density calculation unit 303 uses the magnetic pole position to subject the calculated six magnetic flux densities $\lambda Txa$ to $\lambda Txf$ to dq conversion, to thereby calculate, as harmonic components of respective orders in a radial component of an air gap magnetic flux density of the motor 1, the harmonic components $\lambda xd3$, $\lambda xd5$, . . . of the respective orders in the radial d-axis magnetic flux density and the harmonic components $\lambda xq3$, $\lambda xq5$, . . . of the respective orders in the radial q-axis magnetic flux density. The radial component of the air gap magnetic flux density is hereinafter referred to as "radial magnetic flux density."

As described above, the radial magnetic flux density calculation unit 303 calculates, as harmonic components of respective orders in the radial magnetic flux density, the harmonic components $\lambda xd3$, $\lambda xd5$, . . . of the respective orders in the radial d-axis magnetic flux density and the harmonic components $\lambda xq3$, $\lambda xq5$, . . . of the respective orders in the radial q-axis magnetic flux density.

Referring back to the description of FIG. 5, the circumferential magnetic flux density calculation unit 304 receives, as input, magnetic flux densities $\lambda Tya$, $\lambda Tyb$, $\lambda Tyc$, $\lambda Tyd$, $\lambda Tye$, and $\lambda Tyf$ in the circumferential direction, which are to be generated at the respective six teeth 14 individually corresponding to the phase windings 17a to 17f. Those magnetic flux densities $\lambda Tya$ to $\lambda Tyf$ correspond to a circumferential component of the air gap magnetic flux density of the motor 1.

The magnetic flux densities $\lambda Tya$ to $\lambda Tyf$ to be input to the circumferential magnetic flux density calculation unit 304 are detected by the circumferential magnetic flux density detection unit 40 illustrated in FIG. 1, FIG. 3, and FIG. 5. The circumferential magnetic flux density detection unit 40 is formed through use of, for example, a coil mounted so that a circumferential magnetic flux of a slot-open portion of the motor vertically interlinks with the coil. The circumferential magnetic flux density detection unit 40 configured to detect the magnetic flux densities $\lambda Tya$ to $\lambda Tyf$ may be formed through use of a Hall sensor instead of a coil. Further, the circumferential magnetic flux density detection unit 40 configured to detect the magnetic flux densities $\lambda Tya$ to $\lambda Tyf$ may be a configuration applying other magnetic flux detection methods utilizing, for example, tunnel magnetoresistance (TMR) and giant magnetoresistance (GMR). The circumferential magnetic flux density detection unit 40 is provided to, for example, the stator core 15. Specifically, the circumferential magnetic flux density detection unit 40 is arranged on a distal end part of the tooth 14 of the stator core 15. The circumferential magnetic flux density detection unit 40 may be arranged on a surface of the stator core 15 opposing the rotor core 19.

The circumferential magnetic flux density calculation unit 304 performs dq conversion on the input six magnetic flux densities $\lambda Tya$ to $\lambda Tyf$, to thereby calculate, as harmonic components of respective orders in the circumferential component of the air gap magnetic flux density of the motor 1, harmonic components $\lambda yd3$, $\lambda yd5$, . . . of respective orders in a circumferential d-axis magnetic flux density and harmonic components $\lambda yq3$, $\lambda yq5$, . . . of respective orders in a circumferential q-axis magnetic flux density. The circumferential magnetic flux density calculation unit 304 outputs the calculation result to the characteristic parameter calculation unit 305. The circumferential component of the air gap magnetic flux density is hereinafter referred to as "circumferential magnetic flux density."

The number assigned to $\lambda yd$ represents the order of the harmonic component. For example, $\lambda yd3$ represents a third-order harmonic component in the circumferential d-axis magnetic flux density. Similarly, the number assigned to $\lambda yq$ represents the order of the harmonic component. For example, $\lambda yq3$ represents a third-order harmonic component in the circumferential q-axis magnetic flux density.

As described above, the circumferential magnetic flux density calculation unit 304 calculates, as harmonic components of respective orders in the circumferential magnetic flux density, the harmonic components $\lambda yd3$, $\lambda yd5$, . . . of the respective orders in the circumferential d-axis magnetic flux density and the harmonic components $\lambda yq3$, $\lambda yq5$, . . . of the respective orders in the circumferential q-axis magnetic flux density.

The characteristic parameter calculation unit 305 receives, as input, a calculation result of the radial magnetic flux density calculation unit 303 and a calculation result of the circumferential magnetic flux density calculation unit 304.

The characteristic parameter calculation unit 305 calculates, through use of the harmonic components $\lambda xd3$, $\lambda xd5$, . . . of the respective orders in the radial d-axis magnetic flux density, the harmonic components $\lambda xq3$, $\lambda xq5$, . . . of the respective orders in the radial q-axis magnetic flux density, the harmonic components $\lambda yd3$, $\lambda yd5$, . . . of the respective orders in the circumferential d-axis magnetic flux density, and the harmonic components $\lambda yq3$, $\lambda yq5$, . . . of the respective orders in the circumferential q-axis magnetic flux density, inner products corresponding to the respective orders as characteristic parameters P3, P5, . . . . Further, the characteristic parameter calculation unit 305 outputs the calculation result to the comparison unit 307.

The number assigned to P represents the order of the harmonic component. For example, P3 represents, on a dq-axis coordinate system, an inner product of a vector represented by ($\lambda xd3$, $\lambda xq3$) and a vector represented by ($\lambda yd3$, $\lambda yq3$).

As described above, the characteristic parameter calculation unit 305 calculates and outputs, for each order, as a characteristic parameter, an inner product of a vector formed of harmonic components of the same order in the radial d-axis magnetic flux density and the radial q-axis magnetic flux density and a vector formed of harmonic components of the same order in the circumferential d-axis magnetic flux density and the circumferential q-axis order density.

For example, the characteristic parameter P3 corresponding to the third-order harmonic component is, on the dq-axis coordinate system, an inner product of a vector having a d-axis component of λxd3 and a q-axis component of λxq3 and a vector having a d-axis component of λyd3 and a q-axis component of λyq3.

The characteristic parameter command unit 306 outputs, to the comparison unit 307, characteristic parameter command values P3*, P5*, . . . which are command values for controlling the characteristic parameters P3, P5, . . . corresponding to the harmonic components of the respective orders.

The characteristic parameter command values P3*, P5*, . . . are values set in advance by performing analysis, measurement, and the like in advance so as to satisfy the following conditions (1) and (2).

Condition (1): An amplitude ratio of the harmonic components of the respective orders in the radial magnetic flux density becomes a specific ratio, and an amplitude ratio of the harmonic components of the respective orders in the circumferential magnetic flux density becomes a specific ratio. For example, the specific ratio is set to be the same as a ratio of orders of corresponding harmonic components included in a non-load induced voltage.

Condition (2): A phase difference between harmonic components of the same phase in the radial magnetic flux density and the circumferential magnetic flux density becomes a phase difference target value determined in advance. The phase difference target value is designed as appropriate so as to be a value within an allowable range, including 0. This allowable range refers to a range that does not cause inconvenience in achieving an improvement of a current-torque characteristic in consideration of the harmonic component included in the air gap magnetic flux density. In particular, it is preferred to design the phase difference target value to be 0.

As described above, the characteristic parameter command unit 306 outputs the characteristic parameter command values P3*, P5*, . . . set in advance so that the phase difference between the harmonic components of the same order in the radial magnetic flux density and the circumferential magnetic flux density becomes the phase difference target value.

The comparison unit 307 receives, as input, a calculation result of the characteristic parameter command unit 306 and a calculation result of the characteristic parameter calculation unit 305.

The comparison unit 307 calculates, through use of the characteristic parameter command values P3*, P5*, . . . and the characteristic parameters P3, P5, . . . , differences D3, D5, . . . corresponding to the respective orders. Further, the comparison unit 307 outputs the calculation result to the control unit 308.

The number assigned to D represents the order of the harmonic component. For example, D3 represents a difference between the characteristic parameter command value P3* and the characteristic parameter P3.

As described above, the comparison unit 307 calculates, for the respective orders, the differences D3, D5, . . . between the characteristic parameter command values P3*, P5*, . . . input from the characteristic parameter command unit 306 and the characteristic parameters P3, P5, . . . input from the characteristic parameter calculation unit 305.

For example, the difference D3 corresponding to the third-order harmonic component is a difference between the characteristic parameter command value P3* and the characteristic parameter P3.

The control unit 308 receives, as input, the calculation result of the comparison unit 307. The control unit 308 performs PI control so that the differences D3, D5, . . . become characteristic parameter difference target values ε3, ε5, . . . determined in advance, respectively, to thereby calculate six voltage command values va*, vb*, vc*, vd*, ve*, and vf* individually corresponding to the phase windings 17a to 17f. The voltage command values va*, vb*, vc*, vd*, ve*, and vf* are command values for controlling the voltages va, vb, vc, vd, ve, and vf, respectively.

The characteristic parameter difference target values ε3, ε5, . . . are each designed as appropriate so as to be a value within an allowable range, including 0. This allowable range refers to a range that does not cause inconvenience in achieving improvement of the current-torque characteristic in consideration of the harmonic component included in the air gap magnetic flux density. The characteristic parameter difference target values ε3, ε5, . . . may all be, but not required to be, the same value. In particular, it is preferred to design each of the characteristic parameter difference target values ε3, ε5, . . . to be 0.

The control unit 308 controls, in accordance with the calculated voltage command values va* to vf*, for each of the six H-bridge circuits, operations of the respective switches, that is, the first positive-side switch 26, the first negative-side switch 28, the second negative-side switch 29, and the second positive-side switch 30.

As described above, the control unit 308 calculates the voltage command values va* to vf* to be applied to the respective phase windings 17a to 17f so that the differences D3, D5, . . . corresponding to the respective orders input from the comparison unit 307 become the characteristic parameter difference target values ε3, ε5, . . . , respectively, and controls the inverter 200 in accordance with the voltage command values va* to vf*.

Figure 6:
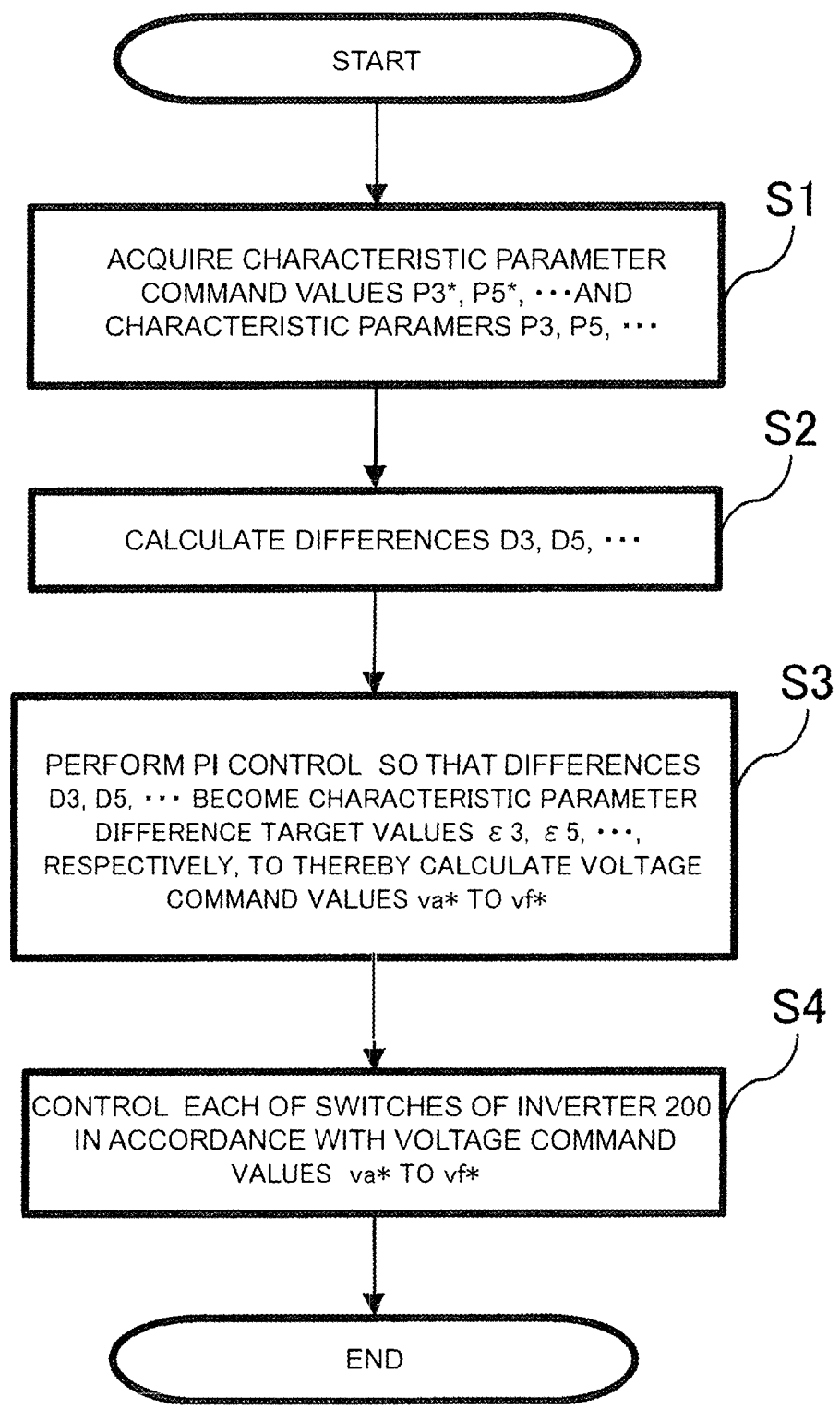
FIG. 6 is a flow chart for illustrating a series of processing steps to be performed by the control device according to the first embodiment of the present invention to control the inverter.

Next, a series of processing steps to be performed by the control device 300 according to the first embodiment to control the inverter 200 is described with reference to FIG. 6. FIG. 6 is a flow chart for illustrating the series of processing steps to be performed by the control device 300 according to the first embodiment of the present invention to control the inverter 200. For example, the processing of the flow chart of FIG. 6 is repeatedly executed at a cycle set in advance.

In Step S1, the comparison unit 307 acquires the characteristic parameter command values P3*, P5*, . . . from the characteristic parameter command unit 306, and acquires the characteristic parameters P3, P5, . . . from the characteristic parameter calculation unit 305. After that, the processing proceeds to Step S2.

In Step S2, the comparison unit 307 calculates, through use of the characteristic parameter command values P3*, P5*, . . . acquired in Step S1 and the characteristic parameters P3, P5, . . . acquired in Step S1, the differences D3, D5, . . . corresponding to the respective orders. After that, the processing proceeds to Step S3.

In Step S3, the control unit 308 performs PI control so that the differences D3, D5, . . . calculated in Step S2 become the characteristic parameter difference target values ε3, ε5, . . . , respectively, to thereby calculate the six voltage command values va* to vf* individually corresponding to the phase windings 17a to 17f. After that, the processing proceeds to Step S4.

In Step S4, the control unit 308 controls the operations of the switches of the inverter 200 in accordance with the voltage command values va* to vf* calculated in Step S3. After that, the processing is ended.

As can be understood from the above, the control device 300 includes the control unit 308 configured to control the inverter 200 so that the phase difference between the harmonic components of the same order among the harmonic components included in the radial magnetic flux density and the harmonic components included in the circumferential magnetic flux density of the air gap portion between the stator core 15 and the rotor core 19 of the motor 1 becomes the phase difference target value. Accordingly, in the motor 1, the phase difference between the harmonic components of the same order in the radial magnetic flux density and the circumferential magnetic flux density can be brought to the phase difference target value. Therefore, the harmonic component can be controlled so that the torque of the harmonic component is maximized. As a result, the current-torque characteristic is improved.

The voltage detection unit 301 is configured to detect the voltages va to vf to be applied to the respective phase windings 17a to 17f of the motor 1, and the radial magnetic flux density calculation unit 303 is configured to calculate, through use of the voltages va to vf detected by the voltage detection unit 301, the magnetic flux densities $\lambda Txa$ to $\lambda Txf$ in the radial direction, which are to be caused at the respective teeth. Accordingly, it is not required to add, to the motor 1, a new member for detecting the magnetic flux density in the radial direction passing through each tooth. As a result, the configuration contributes to downsizing of the motor 1.

In the motor 1, the number of teeth 14 opposed to one pole pair is six, and the six-phase phase windings 17a to 17f that can be controlled independently in the respective phases are individually arranged in the six stator slots 16 formed by those six teeth 14. Accordingly, there is a degree of freedom to appropriately control the magnetic flux density to be caused at each of the six teeth 14. As a result, the torques of all of the teeth 14 can be maximized.

The voltage detection unit 301 may include a low-pass filter between the load-side lead 23 and the counter-load-side lead 24 of the motor 1. In this manner, voltage variations to be caused by the switching of the inverter 200 configured to control the motor 1 to be driven by pulse width modulation (PWM) can be suppressed.

In the first embodiment, there is exemplified a case in which the magnetic flux density is used to perform control so that the phase difference between the harmonic components of the same order in the radial component and the circumferential component of the magnetic flux density of the air gap portion becomes the phase difference target value. However, similar effects can be obtained even when a magnetic flux is used instead of the magnetic flux density.

In the first embodiment, there is exemplified a case in which each phase winding 17 is formed to have a full-pitch wave winding configuration. However, the configuration of each phase winding 17 is not limited thereto, and similar effects can be obtained even with other configurations. For example, similar effects can be obtained even when each phase winding 17 is a concentrated winding. Further, similar effects can be obtained even when each phase winding 17 is a fractional pitch winding.

In the first embodiment, as an example in which the number of slots per pole per phase is one, there is shown a case in which, in the motor 1, the number of phases is six, the number of slots is forty eight, and the number of magnetic poles is eight, but the present invention is not limited thereto. For example, similar effects can be obtained even when the number of phases is six, the number of slots is thirty six, and the number of magnetic poles is six.

Further, similar effects can be obtained even when the number of slots per pole per phase is a number different from one, for example, when the number of phases is six, the number of slots is seventy two, and the number of magnetic poles is eight. Still further, similar effects can be obtained even when the number of phases is a number different from six, for example, five or seven.

The motor 1 to which the present invention is applicable is not limited to permanent magnet motors such as an interior permanent magnet (IPM) motor and a surface permanent magnet (SPM) motor. For example, similar effects can be obtained even when the present invention is applied to other motors such as an induction motor, a switched reluctance motor, and a synchronous reluctance motor.

In the first embodiment, there is exemplified a case in which the individual DC power supplies are connected to the six inverter sub-units 201, respectively, but similar effects can be obtained even when the six inverter sub-units 201 are each connected in parallel to the same DC power supply.

As described above, according to the first embodiment, the control device for a rotating electric machine is configured to control the inverter configured to apply a voltage to each phase winding so that the phase difference between the harmonic components of the same order among the harmonic components included in the radial magnetic flux density and the harmonic components included in the circumferential magnetic flux density of the air gap portion between the stator core and the rotor core becomes the phase difference target value determined in advance.

Specifically, the control device for a rotating electric machine is configured to calculate, for each order, as a characteristic parameter, an inner product of a vector formed of the harmonic components of the same order in the radial d-axis magnetic flux density and the radial q-axis magnetic flux density and a vector formed of the harmonic components of the same order in the circumferential d-axis magnetic flux density and the circumferential q-axis magnetic flux density. Further, the control device for a rotating electric machine is configured to calculate the voltage command value to be applied to the each phase winding so that the calculated characteristic parameter corresponding to each order matches the characteristic parameter command value corresponding to each order set in advance, and to control the inverter in accordance with the calculated voltage command value.

In this manner, the phases of the harmonic components of the same order in the radial magnetic flux density and the circumferential magnetic flux density are substantially the same. As a result, in the rotating electric machine, the improvement of the current-torque characteristic in consideration of the harmonic component included in the air gap magnetic flux density can be achieved. Further, a circumferential component of a Maxwell stress to be calculated from the radial magnetic flux density and the circumferential magnetic flux density, that is, torque can be maximized.

Figure 7:
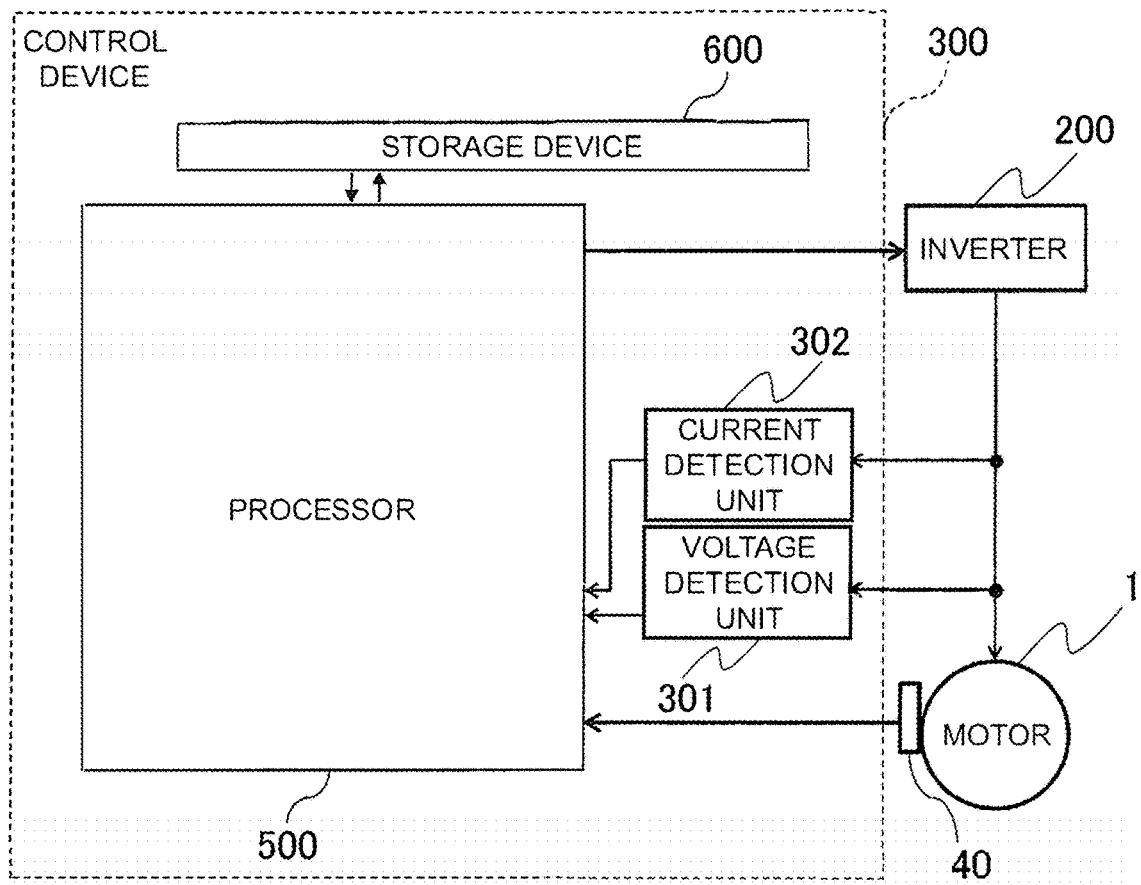
FIG. 7 is a configuration diagram for illustrating an example of a hardware configuration of the control device according to the first embodiment of the present invention.

As a hardware configuration of the control device 300 according to the first embodiment, for example, a configuration illustrated in FIG. 7 can be given. FIG. 7 is a configuration diagram for illustrating an example of the hardware configuration of the control device 300 according to the first embodiment of the present invention.

As illustrated in FIG. 7, the control device 300 includes, as the hardware configuration, a processor 500 and a storage device 600. The functions of the radial magnetic flux density calculation unit 303, the circumferential magnetic flux density calculation unit 304, the characteristic parameter calculation unit 305, the characteristic parameter command unit 306, the comparison unit 307, and the control unit 308 described above are implemented by the processor 500 executing a program stored in the storage device 600. The voltage detection unit 301 and the current detection unit 302 described above are implemented by a voltage sensor and a current sensor, respectively.

The storage device 600 includes a volatile storage device, for example, a random access memory, and a non-volatile auxiliary storage device, for example, a flash memory. The storage device 600 may include an auxiliary storage device, for example, a hard disk, in place of the non-volatile auxiliary storage device.

The processor 500 receives, as input, a program via the volatile storage device from the non-volatile auxiliary storage device of the storage device 600. The processor 500 executes the input program. The processor 500 outputs data, for example, a calculation result to the volatile storage device, or outputs the data via the volatile storage device to the non-volatile auxiliary storage device to store the data.

The functions of the radial magnetic flux density calculation unit 303, the circumferential magnetic flux density calculation unit 304, the characteristic parameter calculation unit 305, the characteristic parameter command unit 306, the comparison unit 307, and the control unit 308 described above may be implemented by a processing circuit, for example, a system LSI.

Second Embodiment

In a second embodiment of the present invention, description is given of the control device 300 having a configuration different from that in the above-mentioned first embodiment. In the second embodiment, description of points similar to the above-mentioned first embodiment is omitted, and points different from the above-mentioned first embodiment are mainly described.

Figure 8:
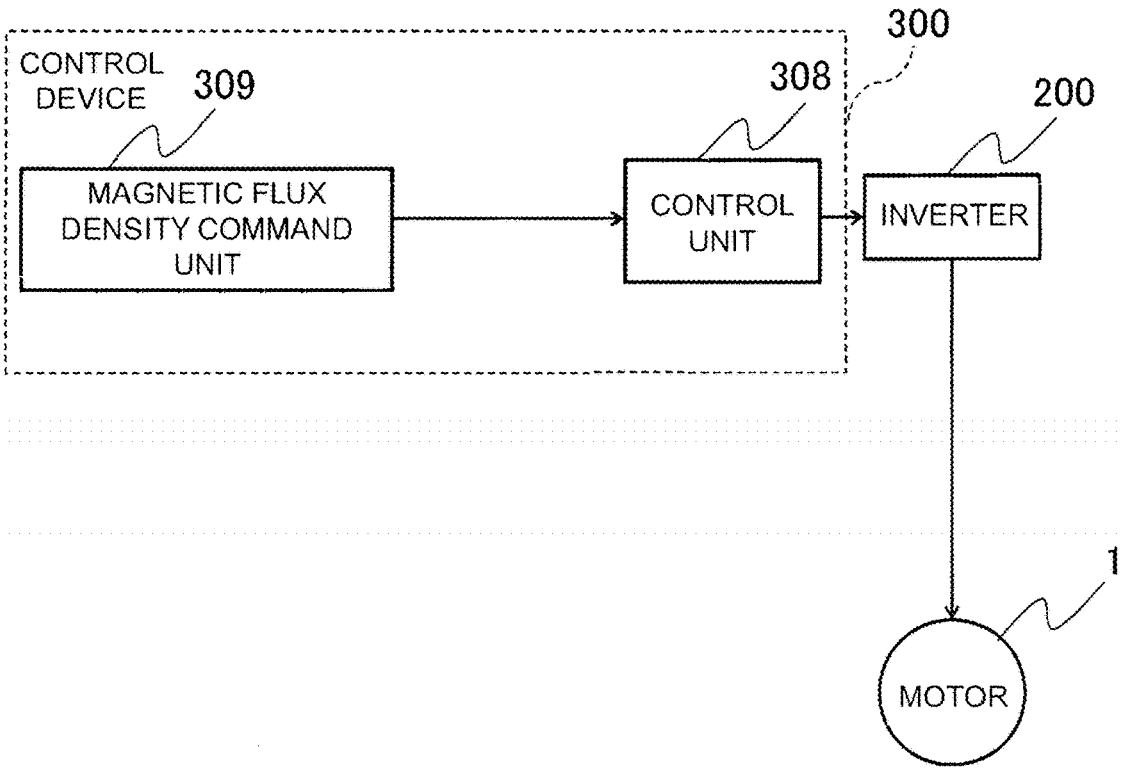
FIG. 8 is a block diagram for illustrating a configuration of a control device according to a second embodiment of the present invention.

FIG. 8 is a block diagram for illustrating the configuration of the control device 300 according to the second embodiment of the present invention. As illustrated in FIG. 8, the control device 300 includes a magnetic flux density command unit 309 and the control unit 308.

The magnetic flux density command unit 309 receives, as input, the number of revolutions and torque of the motor 1. The number of revolutions of the motor 1 is detected through use of, for example, a revolution number sensor mounted to the motor 1. The torque of the motor 1 is detected through use of, for example, a torque sensor mounted to the motor 1.

The magnetic flux density command unit 309 calculates a magnetic flux density command value corresponding to the input number of revolutions and the input torque of the motor 1, in accordance with a magnetic flux density command map set in advance, and outputs the calculated magnetic flux density command value to the control unit 308.

The above-mentioned magnetic flux density command value includes command values for controlling the harmonic components of the respective orders in the radial magnetic flux density and command values for controlling the harmonic components of the respective orders in the circumferential magnetic flux density.

The above-mentioned magnetic flux density command map is a map in which the number of revolutions and the torque of the motor 1 are associated with the magnetic flux density command value so that the phase difference between the harmonic components of the same order in the radial magnetic flux density and the circumferential magnetic flux density becomes the phase difference target value. The magnetic flux density command map is set by performing analysis, measurement, and the like in advance.

The control unit 308 performs PI control in accordance with the magnetic flux density command value input from the magnetic flux density command unit 309, to thereby calculate the six voltage command values va*, vb*, vc*, vd*, ve*, and vf* individually corresponding to the phase windings 17a to 17f.

The control unit 308 controls, in accordance with the calculated voltage command values va* to vf*, for each of the six H-bridge circuits, operations of the respective switches, that is, the first positive-side switch 26, the first negative-side switch 28, the second negative-side switch 29, and the second positive-side switch 30.

As described above, the control unit 308 is configured to calculate the voltage command values va* to vf* to be applied to the respective phase windings 17a to 17f in accordance with the magnetic flux density command value input from the magnetic flux density command unit 309, and to control the inverter 200 in accordance with the calculated voltage command values va* to vf*.

With the control device 300 being configured as described above, similarly to the above-mentioned first embodiment, the phase difference between the harmonic components of the same order in the radial magnetic flux density and the circumferential magnetic flux density can be brought to the phase difference target value.

As described above, according to the second embodiment, the control device for a rotating electric machine is configured to: calculate the magnetic flux density command value corresponding to the number of revolutions and the torque of the rotating electric machine, in accordance with the magnetic flux density command map set in advance; calculate the voltage command value to be applied to the each phase winding in accordance with the calculated magnetic flux density command value; and control the inverter in accordance with the calculated voltage command value.

Even with such a configuration, effects similar to those in the above-mentioned first embodiment can be obtained. Further, the control device 300 of the second embodiment has a smaller number of components as compared to the configuration of the control device 300 of the above-mentioned first embodiment, and hence the second embodiment can contribute to the downsizing of the control device 300.

Third Embodiment

In a third embodiment of the present invention, description is given of the control device 300 having a configuration different from those in the above-mentioned first and second embodiments. In the third embodiment, description of points similar to the above-mentioned first and second embodiments is omitted, and points different from the above-mentioned first and second embodiments are mainly described.

Figure 9:
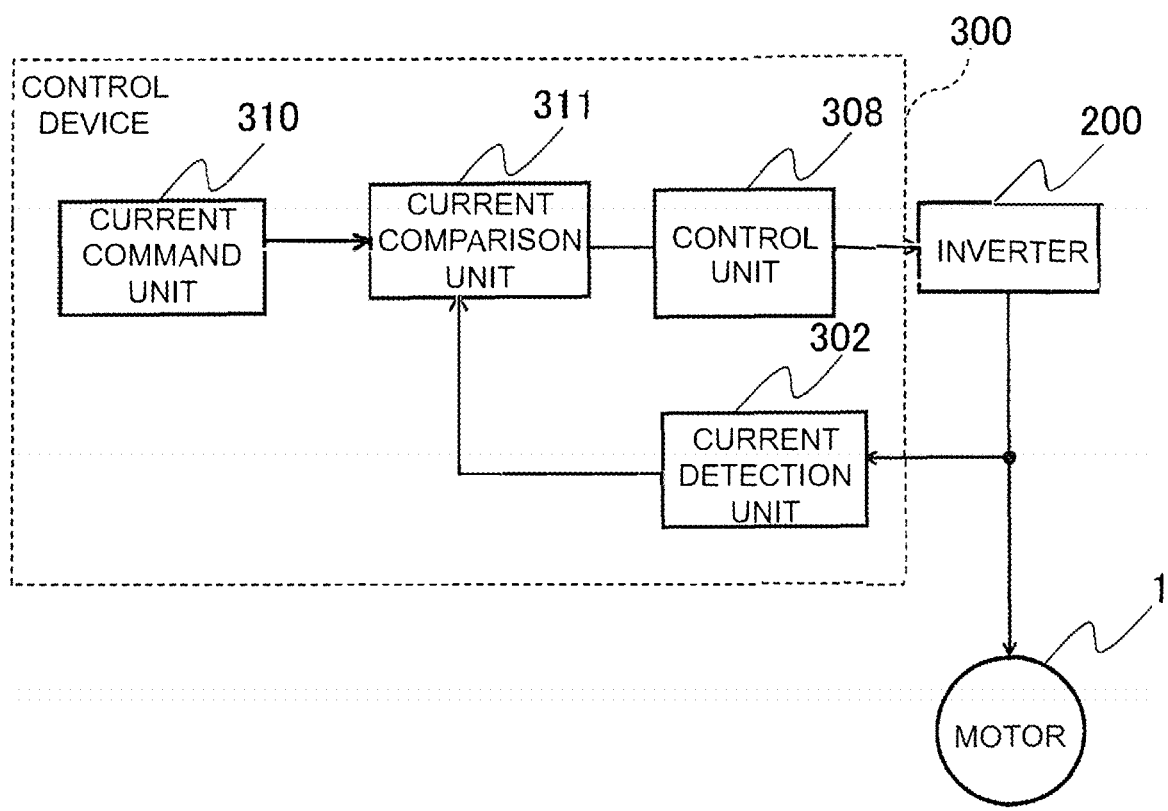
FIG. 9 is a block diagram for illustrating a configuration of a control device according to a third embodiment of the present invention.

FIG. 9 is a block diagram for illustrating the configuration of the control device 300 according to the third embodiment of the present invention. As illustrated in FIG. 9, the control device 300 includes a current command unit 310, a current comparison unit 311, the current detection unit 302, and the control unit 308.

Similarly to the above-mentioned second embodiment, the current command unit 310 receives, as input, the number of revolutions and torque of the motor 1.

The current command unit 310 calculates a current command value corresponding to the input number of revolutions and the input torque of the motor 1, in accordance with a current command map set in advance, and outputs the calculated current command value to the current comparison unit 311.

The above-mentioned current command value includes command values ia*, ib*, ic*, id*, ie*, and if* for controlling the respective currents ia to if to be supplied to the respective phase windings 17a to 17f.

The above-mentioned current command map is a map in which the number of revolutions and the torque of the motor 1 are associated with the current command value so that the phase difference between the harmonic components of the same order in the radial magnetic flux density and the circumferential magnetic flux density becomes the phase difference target value. The current command map is set by performing analysis, measurement, and the like in advance.

The current comparison unit 311 calculates, for the respective phases, the differences between the six current command values ia* to if* input from the current command unit 310 and the six currents ia to if detected by the current detection unit 302, and outputs the calculation result to the control unit 308.

The control unit 308 performs PI control so that the six differences input from the current comparison unit 311 each become a current difference target value determined in advance, to thereby calculate the six voltage command values va*, vb*, vc*, vd*, ve*, and vf* individually corresponding to the phase windings 17a to 17f.

The current difference target values are each designed as appropriate so as to be a value within an allowable range, including 0. This allowable range refers to a range that does not cause inconvenience in achieving the improvement of the current-torque characteristic in consideration of the harmonic component included in the air gap magnetic flux density. The current difference target values may all be, but not required to be, the same value. In particular, it is preferred to design each of the current difference target values to be 0.

The control unit 308 controls, in accordance with the calculated voltage command values va* to vf*, for each of the six H-bridge circuits, operations of the respective switches, that is, the first positive-side switch 26, the first negative-side switch 28, the second negative-side switch 29, and the second positive-side switch 30.

As described above, the control unit 308 calculates the voltage command values to be applied to the respective phase windings 17a to 17f so that the differences corresponding to the each phase input from the current comparison unit 311 become the current difference target values, respectively, and controls the inverter 200 in accordance with the calculated voltage command values.

With the control device 300 being configured as described above, similarly to the above-mentioned first and second embodiments, the phase difference between the harmonic components of the same order in the radial magnetic flux density and the circumferential magnetic flux density can be brought to the phase difference target value.

As described above, according to the third embodiment, the control device for a rotating electric machine is configured to: calculate the current command value corresponding to the number of revolutions and the torque of the rotating electric machine, in accordance with the current command map set in advance; calculate the voltage command value to be applied to the each phase winding so that, for each phase, the current command value matches the current to be supplied to the each phase winding; and control the inverter in accordance with the calculated voltage command value.

Even with such a configuration, effects similar to those in the above-mentioned first embodiment can be obtained. Further, the maximization of the current-torque characteristic in consideration of the harmonic component included in the air gap magnetic flux density is performed through current feedback control. Accordingly, the configuration of the third embodiment is applicable to a drive system for current feedback control, which is generally and frequently used.

REFERENCE SIGNS LIST 1 motor, 2 frame, 3 load-side bracket, 4 counter-load-side bracket, 5 load-side bearing, 6 counter-load-side bearing, 7 shaft, 8 rotor, 9 stator, 10 case, 11 bearing presser, 12 wave washer, 13 yoke, 14 tooth, 15 stator core, 16 stator slot, 17, 17a-17f phase winding, 18 insulator, 19 rotor core, 20 magnet slot, 21 permanent magnet, 22 end plate, 23 load-side lead, 24 counter-load-side lead, 25 lead-out port, 26 first positive-side switch, 27 DC power supply, 28 first negative-side switch, 29 second negative-side switch, 30 second positive-side switch, 31 positive terminal, 32 negative terminal, 40 circumferential magnetic flux density detection unit, 100 drive system, 200 inverter, 201 inverter sub-unit, 300 control device, 301 voltage detection unit, 302 current detection unit, 303 radial magnetic flux density calculation unit, 304 circumferential magnetic flux density calculation unit, 305 characteristic parameter calculation unit, 306 characteristic parameter command unit, 307 comparison unit, 308 control unit, 309 magnetic flux density command unit, 310 current command unit, 311 current comparison unit, 400 load, 500 processor, 600 storage device

The invention claimed is:

1. A control device for a rotating electric machine, the control device being configured to control an inverter configured to apply a voltage to each phase winding of a rotating electric machine, to thereby control, for the each phase winding, a current to be supplied to the each phase winding, the control device comprising:
control circuitry configured to calculate a voltage command value to be applied to the each phase winding so that a phase difference between harmonic components of the same order in a radial magnetic flux density and a circumferential magnetic flux density of an air gap portion between a stator core and a rotor core of the rotating electric machine becomes a phase difference target value determined in advance, and to control the inverter in accordance with the calculated voltage command value.

2. The control device for a rotating electric machine according to claim 1, further comprising:
radial magnetic flux density calculation circuitry configured to calculate, as harmonic components of respective orders in the radial magnetic flux density, harmonic components of respective orders in a radial d-axis magnetic flux density and harmonic components of respective orders in a radial q-axis magnetic flux density;
circumferential magnetic flux density calculation circuitry configured to calculate, as harmonic components of respective orders in the circumferential magnetic flux density, harmonic components of respective orders in a circumferential d-axis magnetic flux density and harmonic components of respective orders in a circumferential q-axis magnetic flux density;

characteristic parameter calculation circuitry configured to calculate and output, for each order, as a characteristic parameter, an inner product of a vector formed of harmonic components of the same order in the radial d-axis magnetic flux density and the radial q-axis magnetic flux density and a vector formed of harmonic components of the same order in the circumferential d-axis magnetic flux density and the circumferential q-axis magnetic flux density;

characteristic parameter command circuitry configured to output a characteristic parameter command value set in advance so that the phase difference between the harmonic components of the same order in the radial magnetic flux density and the circumferential magnetic flux density becomes the phase difference target value; and comparison circuitry configured to calculate, for the each order, a difference between the characteristic parameter command value input from the characteristic parameter command circuitry and the characteristic parameter input from the characteristic parameter calculation circuitry, and to output the calculated difference corresponding to the each order, wherein the control circuitry is configured to calculate the voltage command value so that the difference corresponding to the each order input from the comparison circuitry becomes a characteristic parameter difference target value determined in advance, and to control the inverter in accordance with the calculated voltage command value.

3. The control device for a rotating electric machine according to claim 1, wherein a magnetic flux density command map in which the number of revolutions and torque of the rotating electric machine are associated with a magnetic flux density command value so that the phase difference between the harmonic components of the same order in the radial magnetic flux density and the circumferential magnetic flux density becomes the phase difference target value is set in advance, wherein the magnetic flux density command value includes command values for controlling the harmonic components of the respective orders in the radial magnetic flux density and command values for controlling the harmonic components of the respective orders in the circumferential magnetic flux density, wherein the control device further comprises a magnetic flux density command circuitry configured to calculate the magnetic flux density command value corresponding to the input number of revolutions and the input torque, in accordance with the magnetic flux density command map, and to output the calculated magnetic flux density command value, and wherein the control circuitry is configured to calculate the voltage command value in accordance with the magnetic flux density command value input from the magnetic flux density command circuitry, and to control the inverter in accordance with the calculated voltage command value.

4. The control device for a rotating electric machine according to claim 1, wherein a current command map in which the number of revolutions and torque of the rotating electric machine are associated with a current command value so that the phase difference between the harmonic components of the same order in the radial magnetic flux density and the circumferential magnetic flux density becomes the phase difference target value is set in advance, wherein the current command value includes a command value for controlling each current to be supplied to the each phase winding, wherein the control device further comprises:

current command circuitry configured to calculate the current command value corresponding to the input number of revolutions and the input torque, in accordance with the current command map, and to output the calculated current command value; and current comparison circuitry configured to calculate, for each phase, a difference between the current command value input from the current command circuitry unit and the each current to be supplied to the each phase winding, and to output the calculated difference corresponding to the each phase, and wherein the control circuitry is configured to calculate the voltage command value so that the difference corresponding to the each phase input from the current comparison circuitry becomes a current difference target value determined in advance, and to control the inverter in accordance with the calculated voltage command value.

5. The control device for a rotating electric machine according to claim 1, wherein the phase difference target value is 0.

6. The control device for a rotating electric machine according to claim 2, wherein the phase difference target value is 0, and wherein the characteristic parameter difference target value is 0.

7. The control device for a rotating electric machine according to claim 4, wherein the phase difference target value is 0, and wherein the current difference target value is 0.

8. A drive system, comprising:

the control device for a rotating electric machine according to claim 1;

the inverter;

the rotating electric machine; and a circumferential magnetic flux density detection circuitry which is provided to the stator core of the rotating electric machine, and is configured to detect the circumferential magnetic flux density.

* * * * *